April 26, 1927.  1,625,932
R. L. BERG
NONGLARE ATTACHMENT FOR REFLECTORS
Filed May 29, 1924
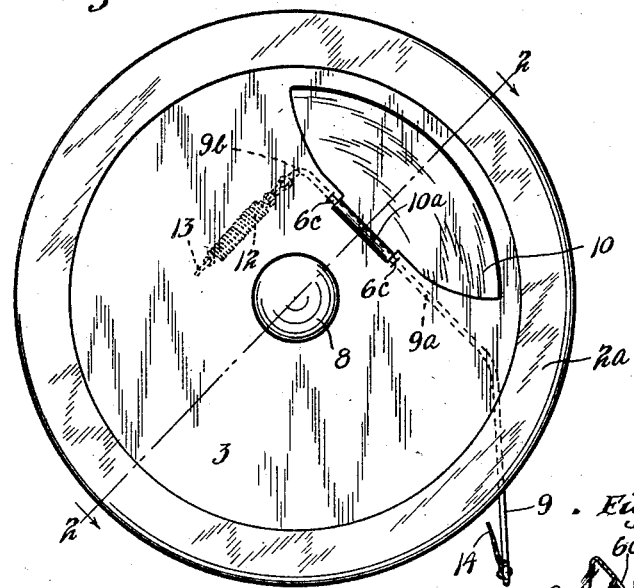
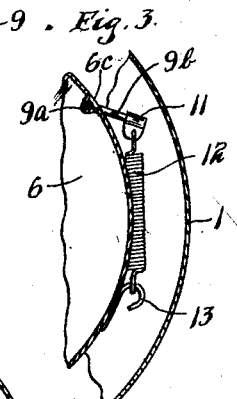
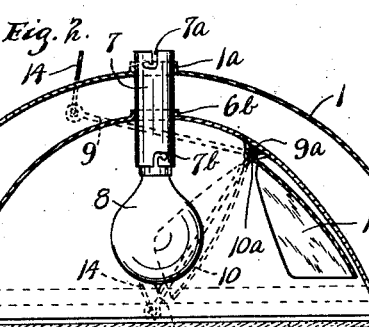
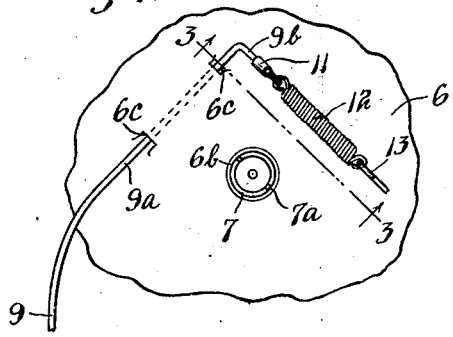
INVENTOR.
ROY L. BERG.
BY HIS ATTORNEY
James F. Williamson Patented Apr. 26, 1927.

1,625,932

UNITED STATES PATENT OFFICE.

ROY L. BERG, OF NEW ULM, MINNESOTA.

NONGLARE ATTACHMENT FOR REFLECTORS.

Application filed May 29, 1924. Serial No. 716,617.

This invention relates to a headlight and particularly to such a headlight as commonly used on vehicles such as automobiles. As is well known to motorists, an objectionable glare occurs when vehicles are approaching each other, due to the drivers facing the bright lights of the approaching machine. While various dimming devices have been proposed, they are, as a rule, objectionable, owing to the diminution of the light preventing the driver from properly seeing the road. As it is often necessary to turn out on the road to pass a vehicle it is quite necessary to be able to see the side of the road to avoid running off the road into a ditch or other obstruction.

It is an object of this invention to provide a non-glare device for a headlight, by means of which the glare into the eyes of the driver of the approaching machine is prevented and also by means of which the light is directed downwardly diagonally towards the side of the road so that the road is clearly illuminated and the driver can see just where he is guiding his machine in turning out.

It is a further object of the invention to provide such a device comprising a pivoted plate mounted in the reflector of the headlight, which plate is mounted diagonally above the lamp bulb with means for swinging said plate downwardly in front of the bulb to prevent glare therefrom and to direct the light from the bulb downwardly and at one side.

It is also an object of the invention to provide such a plate shaped to conform substantially to the shape of the reflector, hinged thereto so as to swing inside of the lens normally held in inoperative position by a tension means with means for swinging the same in front of the bulb.

These and other objects and advantages of the invention will be fully set forth in the following description made in connection with the accompanying drawings in which like reference characters refer to the same parts throughout the different views, and in which, Fig. 1 is a view in front elevation of the headlight having the device thereon.

Fig. 2 is a sectional view taken substantially on the line 2—2 of Fig. 1, as indicated by the arrows;

Fig. 3 is a partial sectional view taken on the line 3—3 of Fig. 4, as indicated by the arrows; and Fig. 4 is a partial view in rear elevation of the reflector and device.

Referring to the drawings, the outer casing 1 of an automobile headlight is shown which is substantially of semi-cylindrical form and which receives over its front and open edge an annular member 2, said member having the front portion 2ª adapted to overlie and contact the outer surface of the lens 3, which lens is held against the packing or gasket strip 5 seated in a groove 6ª formed in the latter edge of the reflector 6. The reflector 6 is of concavo-convex formation and has a central hub 6ᵇ through which and the central hub 1ª of the casing 1 extends a sleeve 7, said sleeve having an L-shaped slot 7ª in its rear end adapted to co-operate with a pin on the hub 1ª. The sleeve 7 is also provided with an L-shaped or bayonet slot 7ᵇ at its inner end which end is disposed in the reflector 6, a lamp bulb 8 being adapted to be disposed in the inner end of the sleeve 7 and held in the slot 7ᵇ, said sleeve forming the socket for said lamp bulb. While any standard form of headlight construction can be used, the parts described illustrate one standard form of headlight construction.

In accordance with the present invention, a rod 9 is provided having a straight portion 9ª extending through openings 6ᶜ in the reflector 6, said rod being journaled in said openings and extending across the inside of the reflector between said openings. A plate 10 has a laterally projecting sleeve 10ª secured to the portion of the rod 9 extending between openings 6ᶜ and which is disposed at the inside of the reflector. One end of the portion 9ª of the rod 9 has its end 9ᵇ bent substantially at a right angle, which end has secured thereto a slip 11 formed of a flat strip of metal bent about said rod and apertured to receive one end of a tension coiled spring 12, the other end of said spring being attached to a hook 13 soldered or otherwise suitably secured to the outside of the reflector 6. The other end of the rod portion 9ª is bent at an angle of substantially 120 degrees and has its free end formed with a loop to which is connected a wire or cable 14 preferably of a flexible character. The wire or cable 14 will be carried to a position adjacent the driver of an automobile and connected to some suitable operating device so that the same can be pulled upon to operate the rod 9. The plate 10 has its outer edge formed substantially on the arc of a circle and substantially concentric with the outer edge of the reflector 6. The sides of the plate 10 are convexly curved so that the plate is roughly of bicuspid shape and the same is formed substantially to fit against the side of the reflector 6 and to conform to the shape thereof. It will be noted that the axis of the portion 9ª of rod 9 extends above the axis of the lamp bulb 8 and sleeve 7 and diagonally upward toward the top of the reflector so that the central transverse axis of the plate 10 which, in Fig. 1, falls substantially on the section line 2—2, is disposed at an angle of 45 degrees with the vertical. The plate 10, therefore might be said to be in one upper corner of the reflector and disposed diagonally at an angle of substantially 45 degrees over the lamp bulb 8.

In operation, the plate 10 normally will be held in the position shown in full lines in Figs. 1 and 2 substantially flat against the inside of the reflector 6, the plate being held in this position by the tension of spring 12. When approaching another car, the operator will pull upon the member 14 by appropriate mechanism and the outer end of the rod 9 will be swung about the portion 9ª as an axis so that plate 10 will be swung substantially to the dotted line position shown in Fig. 2. The plate thus swings downwardly in a diagonal direction over the bulb 8. The light from the bulb thus cannot shine upwardly and the glare therefrom into the eyes of the driver of the approaching vehicle is prevented. At the same time, the light from the lamp will be reflected by plate 10 downwardly at one side of the road so that additional illumination will be given at the side of the road toward which the driver must turn to pass the on-coming vehicle. The plate 10 thus not only serves to prevent the glare but also functions to direct the light to the place where it is most needed and the driver does not have to make a turn to the side of the road which he cannot see. The applicant is aware that it has heretofore been proposed to have swinging plates in the reflectors of headlights but these plates were disposed directly above or below the lamp bulb and had curved side portions so that when swung in front of the bulb the light of the bulb was totally obscured so that no beneficial effect of the light at the side of the road could be had. By disposing the plate diagonally above the lamp bulb and forming the same of the proper shape, a different structure obtaining a new and important result is obtained. The new result obtained is of great importance and has a high degree of utility to the driver of the automobile. It will, of course, be understood that when the tension on the member 14 is relaxed the spring 12 will again move the plate 10 to its inoperative position where it acts as a part of the reflector and in no way interferes with the normal function of the headlight. The plate 10 will be disposed at the appropriate side of the reflector to have the rays from the lamp bulb directed downwardly at the side of the road whether the rays are reflected directly from the plate or from the plate and reflector.

From the above description it is seen that applicant has provided a great improvement in an automobile headlight and one which may be used to avoid the dangers and objections to the glare now present in motoring. The device is of extremely simple construction and can be readily installed on headlights already in use or easily placed thereon when manufactured. The device has been amply demonstrated in actual practice and found to be very successful and efficient for the purpose intended.

It will, of course, be understood, that various changes may be made in the form, details, arrangement and proportions of the parts without departing from the scope of applicant's invention, which generally stated, consists in a device capable of carrying out the objects above set forth, such as shown and described and defined in the appended claim.

What is claimed is:

The combination with a headlight comprising a reflector and a light bulb having an axis normally disposed substantially horizontally, of a plate disposed diagonally above said bulb and in the reflector with its central transverse axis extending at an angle substantially of 45 degrees to the vertical, a rod journaled in the reflector to which said plate is secured, said rod having one end bent at an angle, a tension spring secured to said end adapted normally to hold said plate in inoperative position against the reflector, and said rod having its other end bent to form an operating arm, and means adapted to be pulled upon by the operator for swinging said arm and rod and said plate.

In testimony whereof I affix my signature.

ROY L. BERG.